Dec. 2, 1924.
E. R. BARRETT
CONVERTIBLE VEHICLE BODY
Filed Dec. 9, 1921   3 Sheets-Sheet 1
1,517,697
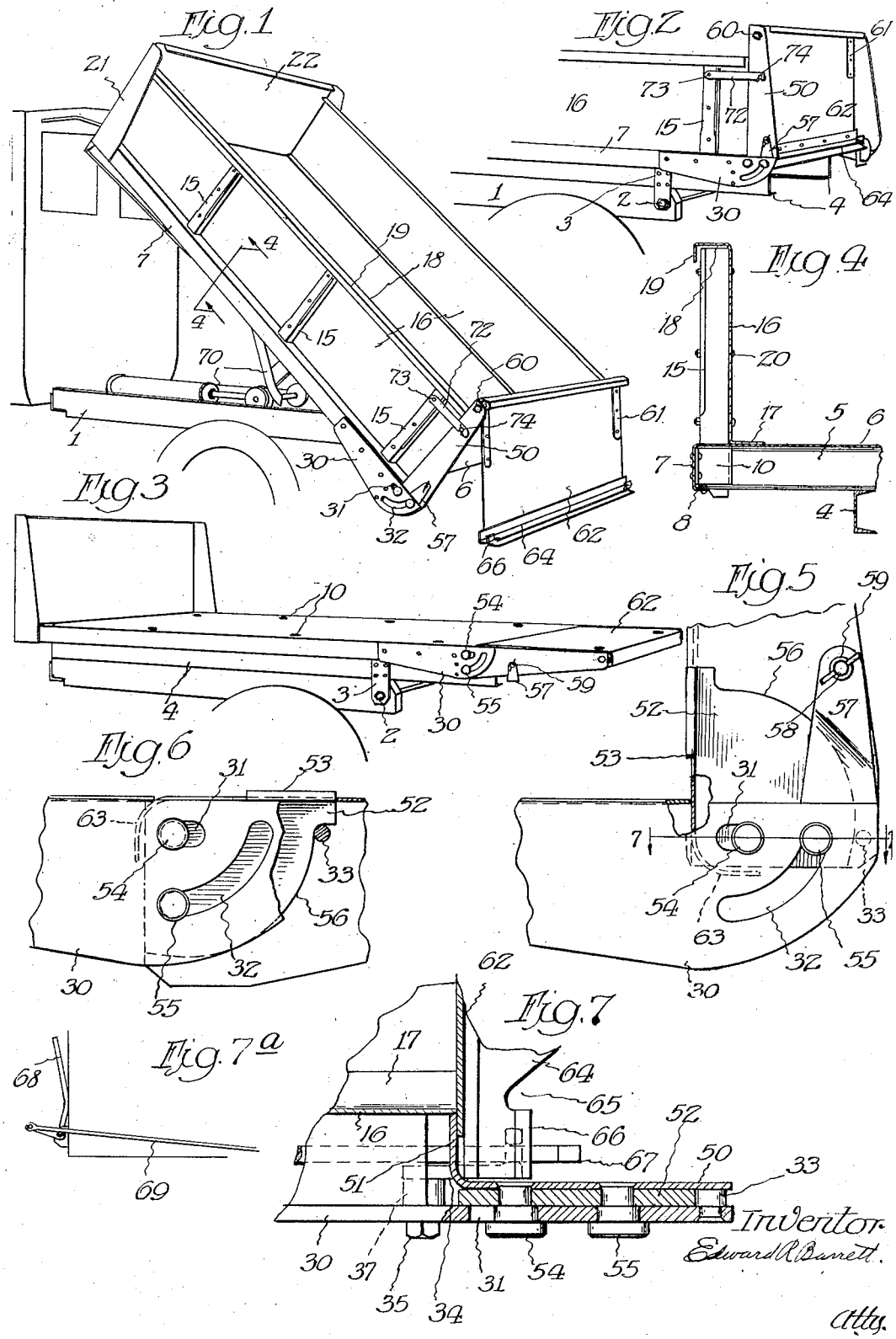

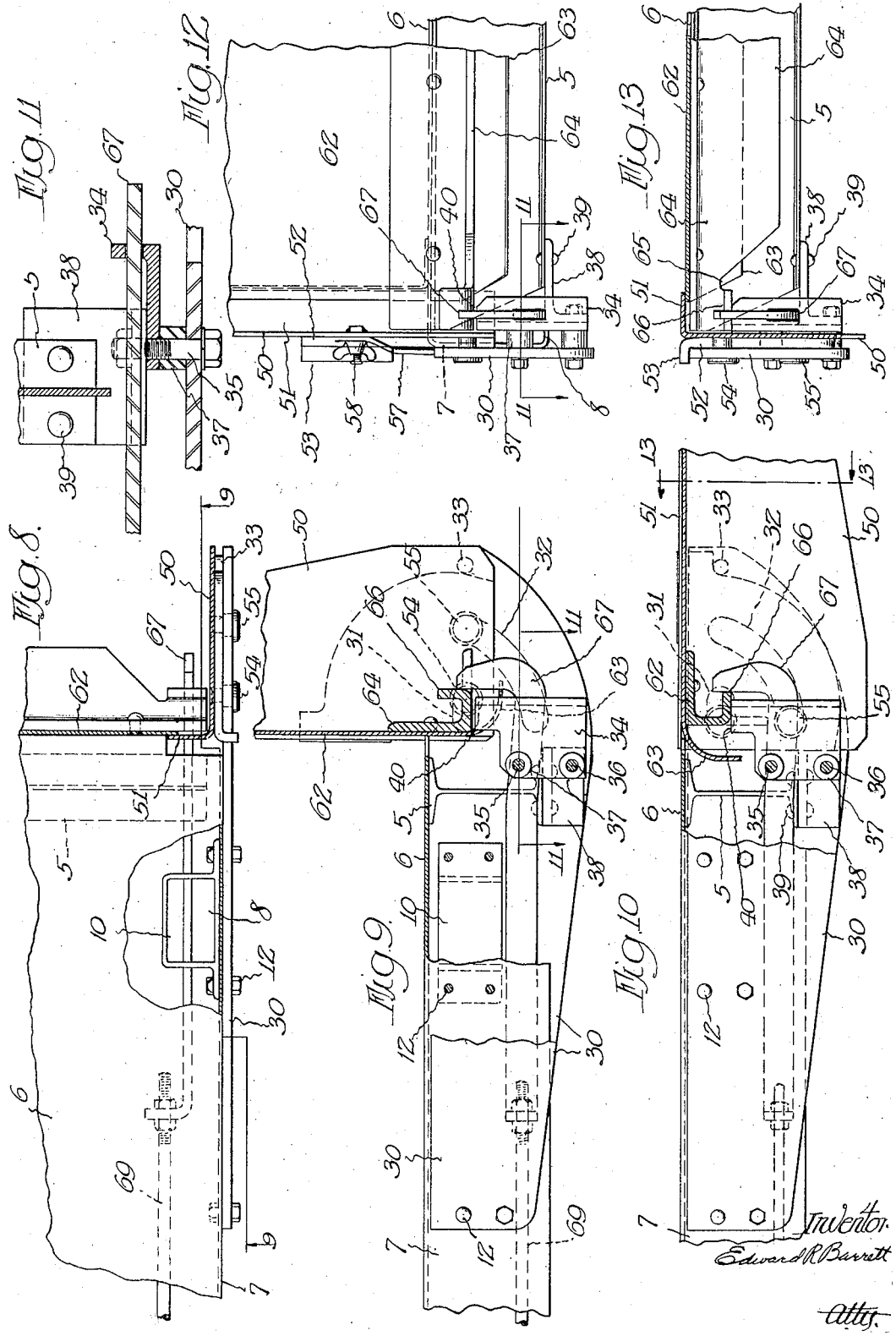

Dec. 2, 1924.
E. R. BARRETT
1,517,697
CONVERTIBLE VEHICLE BODY
Filed Dec. 9, 1921 3 Sheets-Sheet 3
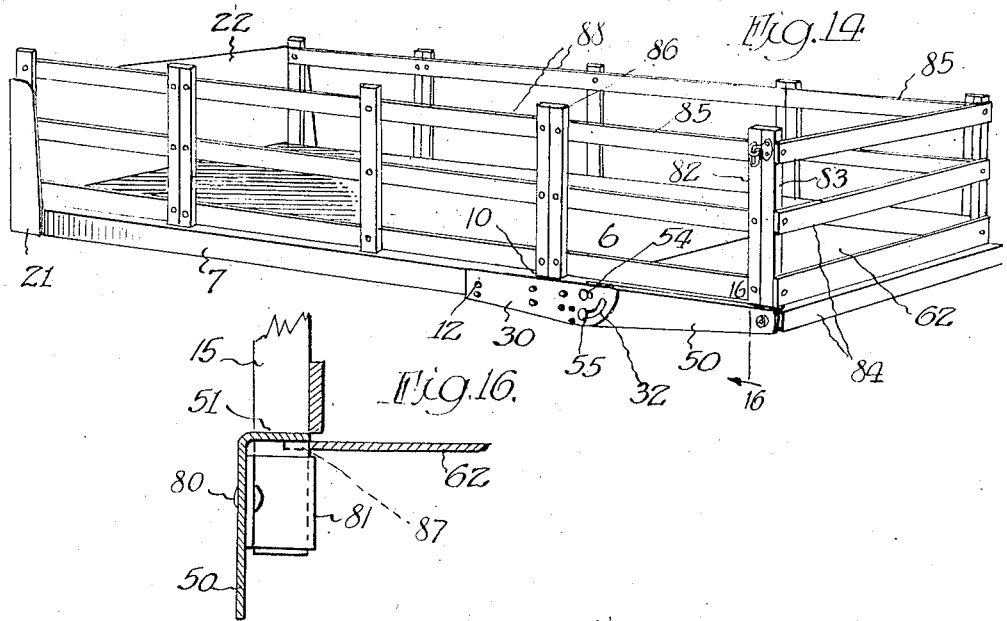
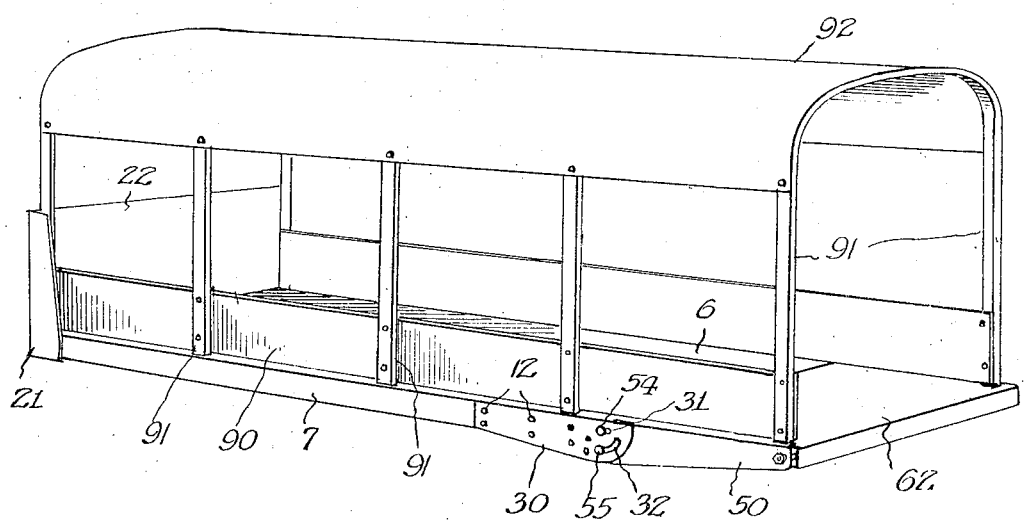
Inventor
Edward R. Barrett.
Attys Patented Dec. 2, 1924.

1,517,697

UNITED STATES PATENT OFFICE.

EDWARD R. BARRETT, OF DETROIT, MICHIGAN.

CONVERTIBLE VEHICLE BODY.

Application filed December 9, 1921. Serial No. 521,109.

*To all whom it may concern:*

Be it known that I, EDWARD R. BARRETT, a citizen of the United States, and a resident of Detroit, county of Wayne, and State of Michigan, have invented certain new and useful Improvements in Convertible Vehicle Bodies, of which the following is a full, clear, concise, and exact description, such as will enable others skilled in the art to which the invention relates to make and use the same, reference being made therein to the accompanying drawings, which form a part of this specification.

The present invention relates to vehicle bodies, especially truck bodies, a leading object being to provide a construction which may be readily converted from the hopper class adapted to be tilted or otherwise discharged through a rear end gate which is suspended from its upper edge portion to a platform class wherein the end gate is utilized as a rearward extension of the bottom of the body. In the preferred construction the side boards or walls are detachable, and all obstructions or projections, such as the fixed corner posts which in usual practice extend above the plane of the upper surface of the bottom of the body, are eliminated, in order that flat articles of maximum size may be carried. Putting it another way, I hinge the corner posts, whereon the end gate is suspended when the body is used for bulk loads, in such manner as to be swung downwardly and rearwardly to a position wherein they support the end gate substantially in the plane of the hopper bottom, or, in other words, as an extension of the platform.

A further object is to insure a close joint between the end gate and the hopper bottom when the former is in horizontal position as well as when upright or closed, and for this purpose I preferably provide a shiftable pivot and associated means for guiding or shifting the end gate into the desired relation as the gate is lowered.

The invention also has for its purpose the provision of a construction of the class stated wherein the corner posts or side arms support the rear ends of the side boards against bulging when the side arm is raised; likewise one in which the tail gate overlaps the side board to form a seal.

Again, in the preferred construction, I so construct the parts that the end gate may be permitted to partly open to spread material when the hopper is tilted and the vehicle is moving, and preferably so that it may be readily closed by the driver even when the vehicle is standing with its front end considerably higher than its rear end.

In accordance with another phase of the invention, the guides for the tail gate hooks tend to force the front edge of the tail gate up against the bottom sheet of the body (or at least tend to prevent sagging) to insure a tight joint when the tail gate is extended. Again, the tail gate latches or hooks, in the preferred construction, tend to draw the tail gate forwardly into engagement with the bottom sheet when the tail gate is in lowered or extended position.

A still further object is to provide a convertible body of the class specified heretofore wherein the stake sockets are located between the edges of the bottom sheet and protected thereby, thus avoiding the chance of being torn off and providing a platform of maximum width, as well as improving the appearance of the body.

The invention also provides improvements in the side boards, as will be more particularly pointed out.

The invention also provides a convertible body which is adapted, when the end gate is in extended position, to receive a side board or enclosing railing or a top structure of the canopy type; also one in which the extended end gate may itself receive a rear rail or end board. Thus there is afforded a body presenting an enclosure of exceptional length.

It will be apparent that certain phases of the invention may advantageously be applied to convertible bodies of the fixed or non-tiltable type.

In the drawings, Fig. 1 is a perspective view showing a preferred embodiment of the invention, the body being in elevated position and the end gate being open to permit discharge of the material; Fig. 2 is a fragmentary view, the body being in lowered position and the end gate being closed; Fig. 3 is a perspective view showing the body converted into the platform type; Fig. 4 is a section on line 4—4 of Fig. 1; Fig. 5 is a fragmentary side elevation, parts being broken away, showing the rear left hand corner of the body, the corner post being elevated and the side boards being removed; Fig. 6 is a similar view, the corner post being extended; Fig. 7 is a section on line 7—7 of Fig. 5; Fig. 7ª is a partial side elevation showing the latching lever in the position it occupies when the end gate is closed and also when the end gate is extended; Fig. 8 is a fragmentary plan view, partly in section and partly broken away, the end gate being closed; Fig. 9 is a section on line 9—9 of Fig. 8; Fig. 10 is a view corresponding to Fig. 9, the end gate being extended; Fig. 11 is a section on lines 11—11 of Figs. 9 and 12; Fig. 12 is an end view corresponding to Fig. 9; Fig. 13 is a section on line 13—13 of Fig. 10; Fig. 14 is a view corresponding to Fig. 3, showing the body arranged in the platform type and equipped with slotted rails and a slotted end rail, although other types of rails or side and end boards might of course be used; Fig. 15 is a similar view, the body being provided with a canopy top; and Fig. 16 is a section on line 16 of Fig. 14.

1 indicates the side bars of a truck on the rear end of which is tiltably mounted, as by means of a pivot shaft 2 and brackets 3 (Fig. 3), a body structure including longitudinally extending sills 4, preferably in vertical alignment with the side bars 1 and adapted to seat directly thereon, although the construction may be otherwise. Mounted on the sills 4 is a bottom structure including cross-bars 5 disposed at intervals therealong and covered with a bottom preferably in the form of a metal sheet 6 whose outer edge portions or flanges extend downwardly at 7 over the ends of the cross-bars 5 and then preferably inwardly to form a flange 8 as best shown in Fig. 4; and within the channels or angle thus formed are positioned stake sockets 10, it being understood that holes are provided in the bottom sheet to allow the insertion of the stakes. The sockets are secured to the bottom structure as by bolting or riveting to the element 7 at 12 (the connections corresponding to the rearmost sockets preferably passing through the plate 30, hereinafter described, which thus serves to reinforce the bottom plate), and the concealed sockets thus formed are adapted to receive the lower ends of wooden or other stakes 15 that, together with the side board sheets 16, go to make up the detachable side boards. The sheets 16 are preferably bent inwardly along their lower margins to form flanges 17 (Fig. 4) that rest on the bottom sheet 6, and at their upper edges said sheets are preferably bent outwardly at 18 and downwardly at 19 to stiffen or reinforce the side boards and to enclose the tops of the stakes. The sheets 16 are bolted or riveted to the stakes as at 20. The front ends of the side boards are shown as fitting within the rearwardly extending flanges 21 formed on the front end wall structure 22.

Referring now more particularly to the corner post and the support therefor, it will be seen that there is bolted or riveted along the outer side of the flange 7 of the bottom sheet 6 a plate 30 which projects rearwardly beyond the end of the bottom sheet, and that the projecting portion has a short substantially horizontally arranged slot 31 and an arc-shaped slot 32, and that it also carries an inwardly projecting stud or the like 33 near its rear end; likewise that the plate 30 is connected to a member 34 (preferably formed by bending and shearing from a flat plate or from a section of angle iron) by the vertically aligned bolts 35, 36 which pass through spacers 37, and that whereas the bolt 35 is tapped into the member 34 (Fig. 11), the bolt 36 passes through the latter and through the down-turned flange of a clip 38 which is riveted at 39 to the rear cross-bar 5 (Figs. 9, 10, 11, 12 and 13). It will thus be apparent that the plate 30 and member 34 together form a rigid chair or support for the corner post. The member 34 has a surface 40 for a purpose hereinafter indicated.

The corner post comprises an angle member 50 preferably formed of bent sheet metal having an in-turned flange 51, said member being reinforced along its outer side on the end nearest the support by a plate 52 having an out-turned flange 53 (Figs. 6 and 13) adapted to bear on the plate 30 when the corner post is in lowered position. This plate carries a stud 54 received in and headed over on the outer side of the slot 31 and forming with the latter a shiftable pivot located some distance below the level of bottom sheet 6, as more fully explained later; likewise the plate 52 carries a similar stud 55 received in the slot 32, whereby, when the corner post is being raised from the position indicated in Fig. 6 to that shown in Fig. 5, the stud 54 is drawn rearwardly in the slot 31. Again the rear face of the plate 52 forms a cam 56 arranged to engage the stud 33 so that the stud 54 is forced to the forward end of the slot 31 as the corner post is swung from the upright position (Fig. 5) to the lowered position (Fig. 6). Of course the stud 55, acting on the other wall of the cam slot 32, tends to cause the same forward movement. Evidently, the stud 33 might be omitted. When the end gate is extended, the weight of the front end portion of the corner post is preferably largely carried by the flange 53 bearing on the plate 30, although said flange might be omitted as will be more clearly understood later. The parts 50 and 52 might obviously be integral. For the purpose of locking the corner posts against rearward swinging when elevated, I prefer to provide a stop 57 pivoted to the corner post at 58 rearwardly of the shiftable pivot 31—54 and adapted to bear on the upper edge of the plate 30, in which position it may be clamped by a wingnut or the like 59 (Fig. 5).

For the purpose of additionally supporting the corner posts in raised position, links 72, pivoted at 73 to the upper end portions of the rear side stakes and arranged to be hooked over pins 74 on the corner posts, or the equivalent, may be provided.

The outer or upper ends of the corner posts are joined by a rod 60 on which is pivotally mounted or hung, as by means of straps 61, an end gate the major portion of which is preferably in the form of a metal sheet 62 having its lower or front edge curved downwardly or rearwardly at 63 in a fillet substantially concentric to the stud 54 when the parts are in the position indicated in Fig. 6. The end gate may of course be constructed in various ways and yet retain the advantages of the invention; I prefer to reinforce it by a cross-bar 64 of angle iron cross-section extending from side to side and having the flange which is perpendicular to the plane of the end gate notched at 65 (Fig. 13) and bent back parallel to said plane to form a bearing shoe 66 adapted to rest on the surface 40 of the block 34 to support the front end of the end gate when the latter is in lowered position (Fig. 10).

It will be seen that the in-turned flange of the member 34 is slotted to form a guide for the latch 67 (which is slidable back and forth therein) and that the up-turned end of said latch is adapted to either engage the rear face of the shoe 66 when the gate is raised (Fig. 9) or the rear edge of said shoe when the gate is lowered (Fig. 10). Thus the bearing shoe also functions as a striker plate for the latch.

The latch 67 is operated by means of a suitable lever 68 (Fig. 7a) pivotally mounted on the front end of the body (as, for example, in the manner shown in United States Letters Patent No. 1,223,462, granted April 24, 1917) and a rod 69 which extends rearwardly along the inner side of the flange 7 by which it is concealed. This construction provides protection for the latches and actuating rods and avoids the danger of their being torn off as sometimes occurs in known constructions.

Any desired type of body-tilting device, such as that shown at 70 in Fig. 1, may be employed, but it will be understood that the hoisting mechanism may be dispensed with altogether, in which case the body may be used either as a platform or as a box.

Operation: Assuming that the body is to be used for handling materials such as coal or earth, the body is assembled as shown in Figs. 1 and 2, and when in tilted position it is only necessary to release the hooks 67, that is, manipulate the lever 68 to allow the hooks to be drawn rearwardly in the guides in the plates 34, to permit the material to be discharged in the usual way. Likewise, by gradually allowing the latches to be drawn rearwardly and by simultaneously tilting the body and running the truck ahead, it is evident that the load may be spread to a desired thickness, as is commonly required in road building. The in-turned flanges 17 on the side boards provide a sufficiently tight joint for this class of service, and, at the same time, permit free discharge of the material.

In the event it is desired to haul articles such as large boxes, or articles which it is desired to load or unload from the side, the side boards are removed, whereupon a flat body having no upward projections is presented. The corner posts and end gate may be left undisturbed, as sufficient support is provided regardless of the links 72, in which case they serve to prevent the articles from falling off the end of the truck. The body thus formed may be turned the "dray" type.

In case long wide articles such, for example, as furniture or sheets of glass are to be hauled, it may become desirable to not only remove the side boards but also to lower the end gate, as indicated in Fig. 3, which the driver may do by pulling back on the upper end thereof after releasing the latches or stops 57. In the resulting movement, the studs 33 are engaged by the cam surfaces 56 and the corner posts are urged forwardly until the studs 54 and 55 occupy the positions shown in Fig. 6, at which time the curved front end 63 of the end gate sheet 62 engages or approaches the rear edge of the bottom sheet 6 (Figs. 6 and 10) so that there is substantially a continuous surface for the support of goods. At the same time the shoe 66 rests on the member 34 and the flange 53 bears on the plate 30, which, together with the action of the studs 54 and 55 in the slots 31 and 32 and the pull of the hooks 67 forwardly, establishes and maintains the proper alignment of the parts. It will be noticed also that the plates 52 are in the same plane as the spacers 37 with which they may come in contact when in their extreme forward position; likewise that the flanges 51 of the corner posts overlap and rest upon the plate 62 of the end gate.

Conversely, as the end gate is raised the studs 55 engage with the walls of the slots 32 to draw the corner posts rearwardly and the plate 62 finally comes into tight engagement with the rear edge of the bottom plate 6, in which position it is held by the hooks 67. The flanges 51 then overlap the end gate to form a tight joint, and in like manner said flanges overlap the side boards and reinforce them against bulging, as shown in Fig. 7.

Referring now to Figs. 14 and 16, it will be noted that I preferably perforate the flanges 51 of the corner posts near their rear ends and attach to the other flange thereof, as by rivets 80 (Fig. 16), stake sockets 81 adapted to receive stakes 82 or 83, or both, and that whereas the latter are connected by slats 84 or the like to form an end board, the former are joined in like manner, as at 85, to stakes 86 which are received in the rear stake sockets 10. It will be understood that the end gate 62 is preferably notched at 87 (Fig. 16) to afford clearance for the stakes 82—83. It is preferred to substitute for the side boards of Fig. 1 a skeleton type as shown at 88, as will be readily understood. The construction thus affords an enclosed body of substantially the same length as the platform body shown in Fig. 3.

In like manner, in lieu of the construction just described, I may employ a top of the canopy type, including the longitudinal boards 90, preferably extending from end to end, the side stakes 91, which form the bows of the top, and the cover 92.

I claim:

1. A vehicle body comprising an end gate construction tiltable in respect thereto from a position in which it constitutes a closure for the end of the body to a position in which it forms an extension for the bottom of the body, and a latching device tending to force said end gate construction forwardly when in either of said positions.

2. A vehicle body comprising a bottom, and an end gate construction embodying rear corner posts mounted to swing from a substantially vertical position to a substantially horizontal position wherein said end gate construction forms a continuation of said bottom, said construction also embodying an end gate hung from said corner posts to swing in respect thereto, and hooks associated with said end gate construction and tending to hold the same in close relation to the rear edge of said bottom in each of said positions.

3. A vehicle body comprising a bottom, and an end gate construction embodying rear corner posts arranged to occupy either a substantially vertical position or a substantially horizontal position, an end gate hung from the outer ends of said posts, and hooks associated with the lower portion of said gate and tending to hold the same in sealed relation to the rear edge of said body when the corner posts are in the first named position.

4. A convertible vehicle body comprising a bottom, and an end gate construction therefor embodying an end gate the lower edge of which forms a tight joint with the rear end portion of said bottom, corner posts mounted to be swung from an upright to a lowered position, said end gate being suspended from said corner posts to swing outwardly about a horizontal axis and forming with said corner posts a rearward extension for said body when the corner posts are in lowered position, and means for insuring a tight joint between said body and the front edge of said end gate when the latter is lowered.

5. A convertible vehicle body comprising pivotally mounted corner posts and an end gate structure supported thereby, side board structures, and a link extending across between each corner post and the corresponding side board structure to retain the former in upright position.

6. A convertible vehicle body comprising a bottom structure and pivotally mounted rear corner posts mounted thereon, and elements carried by said posts and movable in respect thereto cooperating with said bottom structure to hold said posts in upright position.

7. A convertible vehicle body comprising a bottom, pivotally mounted corner posts at the rear end of the bottom adapted to be vertically positioned or turned to horizontal position and having inturned flanges, an end gate construction comprising a plate pivotally mounted near its upper edge to and between the posts and adapted to bear against the flanges of the posts, and side boards having rear edges abutting against the front side of the end gate plate and against the outer sides of which the inner edges of said flanges bear.

8. A convertible vehicle body comprising a bottom, corner posts at the rear end of the bottom positioned vertically and formed with inturned flanges, an end gate construction comprising a plate pivotally mounted near its upper edge to and between the posts and bearing against said flanges of the posts, and side boards having rear edges abutting against the front side of the end gate plate and with the inner edges of said flanges abutting against the outer sides of the side boards adjacent their rear ends.

9. A convertible vehicle body comprising a bottom structure and pivotally mounted corner posts mounted thereon to turn from vertical to horizontal position and vice versa, and latch elements pivotally carried by the posts combined with means for releasably securing said latch elements in fixed relation to the posts adapted to cooperate with said bottom structure when the posts are in vertical position to hold them in such position.

In testimony whereof I affix my signature.

EDWARD R. BARRETT.